Aug. 2, 1932.   J. EDGAR   1,869,413
WORKHOLDER
Filed Jan. 9, 1928   2 Sheets-Sheet 1

INVENTOR
John Edgar
BY
ATTORNEYS

Aug. 2, 1932.   J. EDGAR   1,869,413
WORKHOLDER
Filed Jan. 9, 1928   2 Sheets-Sheet 2
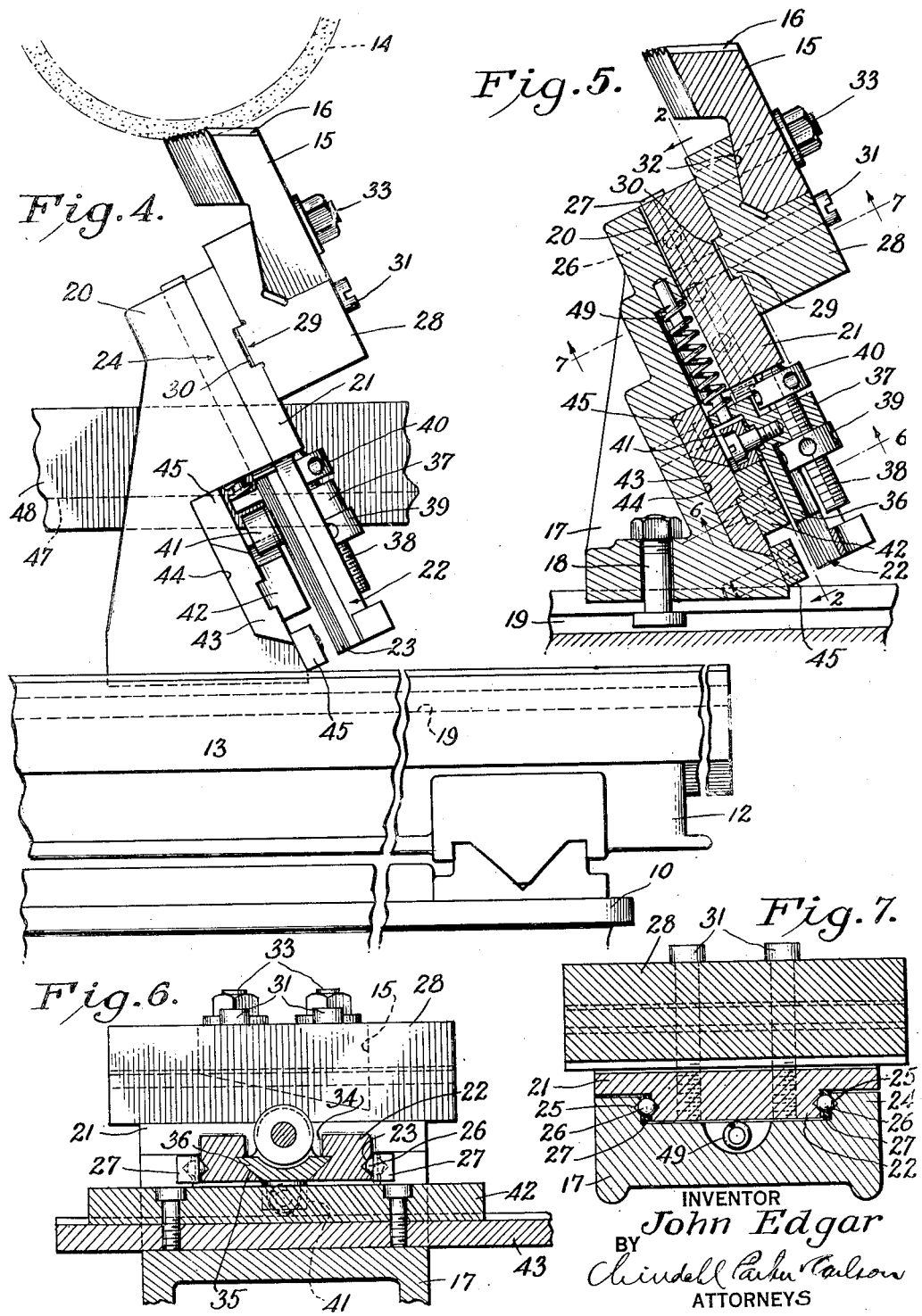

Patented Aug. 2, 1932

1,869,413

UNITED STATES PATENT OFFICE

JOHN EDGAR, OF ROCKFORD, ILLINOIS, ASSIGNOR TO BARBER-COLMAN COMPANY, OF ROCKFORD, ILLINOIS, A CORPORATION OF ILLINOIS

WORKHOLDER

Original application filed November 4, 1927, Serial No. 230,966. Divided and this application filed January 9, 1928. Serial No. 245,342.

The present invention relates to improvements in work holders, and has particular reference to a novel work holder adapted to be incorporated in machine tools, such as grinding machines and to automatically adjust the work blank in the course of the machine operation.

The primary object of the present invention resides in the provision of a novel work holder which will automatically adjust the position of the work blank in one direction upon movement thereof in another direction, and in predetermined relation to said last mentioned movement.

Another object resides in the provision of a new and improved tool holder which is movable as a unit to index the tool, and which has means operable through the indexing movement to adjust the tool in another direction, for example a vertical direction where the indexing is in a horizontal direction, in predetermined relation to the indexing movement so as to present different parts along the tool contour successively into a given plane.

A more specific object resides in the provision of a novel tool holder having a base, a slide on the base and cam means coacting with the base and the slide to actuate the latter on the base upon movement of the base relative to the cam.

Still another object resides in the provision of a work holder of the above character which is simple and inexpensive in construction and which is positive and efficient in operation.

Further objects and advantages will become apparent as the description proceeds.

In the accompanying drawings, Figure 1 is a fragmentary view showing a work holder embodying the features of my invention.

Fig. 4 is a fragmentary view showing the work holder in side elevation.

Fig. 5 is a sectional view taken along line 5—5 of Fig. 1.

Fig. 6 is a fragmentary sectional view taken along line 6—6 of Fig. 5.

Fig. 7 is a sectional view taken along line 7—7 of Fig. 5.

Figure 1:
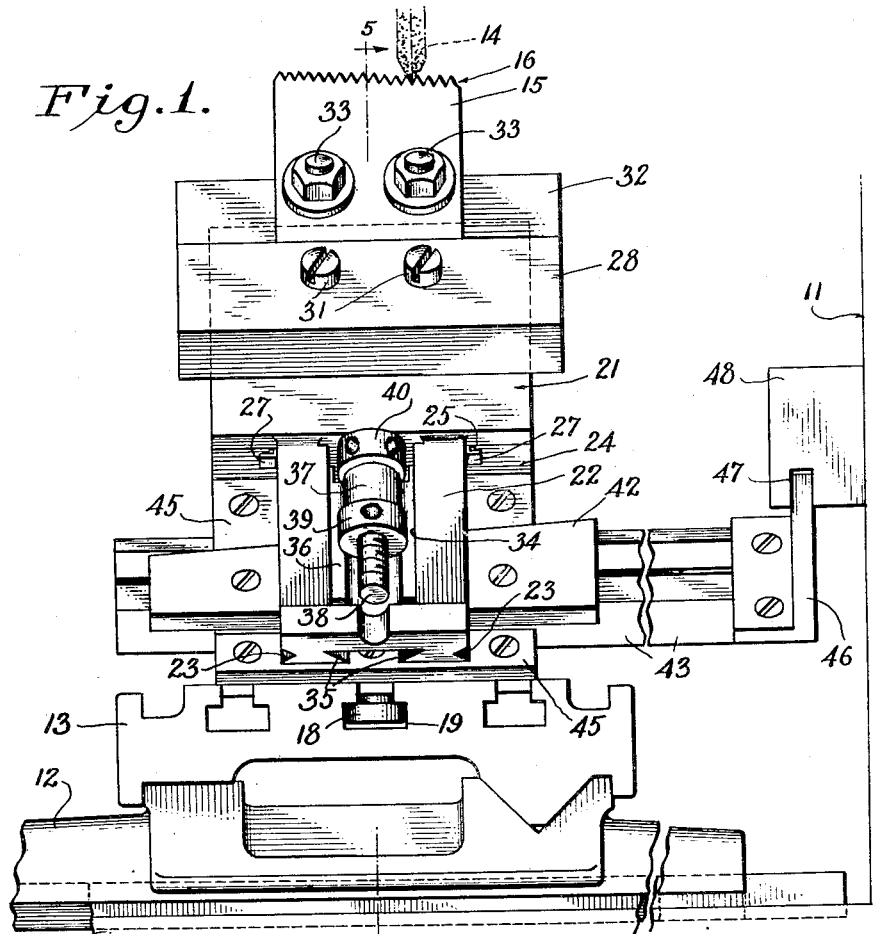
Figures 2, 3:
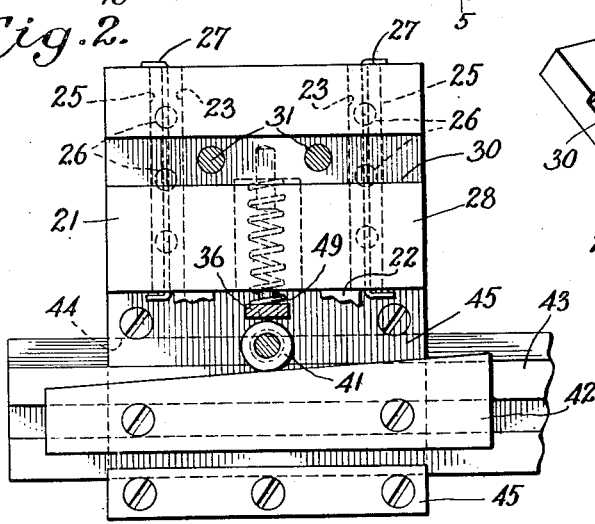
Fig. 2 is a view, partially in section taken along line 2—2 of Fig. 5.
Fig. 3 is a perspective view of the tool slide.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the tool holder constituting the exemplary embodiment of the invention is shown with fragments of the grinding machine disclosed in my copending application Serial No. 230,966, filed November 4, 1927 of which this application is a division, but it is to be understood that the tool holder may be adapted to a large variety of machines.

In the present instance, the grinding machine comprises a base 10 having a vertical column 11. Mounted on the base 10 for movement toward and from the column 11 i. e. transversely, is an indexing slide 12. A traverse slide 13 adapted to support the work holder is mounted on the index slide 12 for reciprocation in the plane of a grinding wheel, i. e. in a front to rear direction, a fragment of which is indicated in dotted outline at 14. The specific means for actuating the slides 12 and 13 is not disclosed herein since it forms no part per se of the present invention.

The tool holder is adapted to carry a tool into grinding relation with the grinding wheel 14. In the present instance, I have shown a work blank 15 having an inclined contour 16 adapted to mill conical parts. The contour comprises a plurality of laterally disposed V-shaped grooves or threads, and the grinding wheel 14 is provided with a suitable V-shaped cutting periphery to grind these threads. It will be understood that the slide 13 carries the work holder with the tool 15 across the grinding wheel 14 to grind the threads individually, and that the slide 12 indexes the threads successively into grinding position.

The work holder comprises a suitable base 17 which is adjustable along the slide 13, and which is adapted to be clamped in position by any suitable means, such as a bolt 18 engaging a T-slot 19 formed longitudinally in the slide. The base 17 is formed with an upwardly inclined surface 20 on which the upper end of a tool slide 21 is slidably mounted. To guide the slide 21, it is formed in its underside with a reduced portion 22 having longitudinal V-shaped grooves 23 in opposite sides. Two parallel guide flanges 24 are provided along opposite side edges of the surface 20, and have longitudinal V-shaped grooves 25 in their inner sides directly opposed to the grooves 23. Disposed in spaced relation between the grooves 23 and 25 are a plurality of ball bearings 26. Preferably, these bearings 26 are held in spaced relation between the grooves 23 and 25 by retainer strips 27, the ends of which are bent to embrace the upper and lower ends of the flanges 24. Mounted on the slide 21, is a suitable work seat 28 which is accurately positioned by a tongue 29 on its underside fitting into a transverse groove 30 in the slide, and which is clamped in place by means of screw bolts 31. The work seat 28 is formed with a suitable notch or seat 32 in which the work blank 15 is secured by means of screw bolts 33.

The lower end of the slide 21 is reduced in width to that of the part 22, is formed with a central longitudinal slot 34, and has a dovetailed guideway 35 formed in the sides of said slot. Slidably disposed in the guideway 35 is an adjusting slide 36 having a lug 37 projecting outwardly through the slot 34. An adjusting screw 38 is threaded through the lug 37, and is adapted to be clamped in any desired position of adjustment by a lock nut 39. The upper end of the screw 38 is provided with a head 40 on which the slide 21 is adapted to rest. The slide 36 has a roller 41 on its underside which rests on the upper edge of a guide bar 42. The upper edge of the guide bar 42 may have any desired contour, and in the present instance is straight and inclined upwardly and laterally so as to compensate for the inclination of the contour 16 of the work blank 15 during the indexing movement. The guide bar 42 is rigidly secured to a slide 43 which is disposed in a lateral guideway 44 in the base 17, and which is held therein by suitable gib plates 45. The slide 43 is held against movement with the base 17 laterally of the base 10 by means of a finger 46 projecting upwardly into a spline engagement with a longitudinal slot 47 in the underside of a block 48 fixed on the column 10. A coiled spring 49 is disposed between the base 17 and the upper end of the slide 36, and tends to hold the roller 41 yieldingly against the cam bar 42.

It will be evident that the vertical position of the work blank 15 will vary in accordance with the lateral position of the work holder regardless of what position longitudinally of the base 10 the latter occupies. In operation, as the tool holder is indexed with the slide 12 to position different V-shaped notches in the blank 15 in operative relation to the grinding wheel 14, the slide roller 41 will move along the bar 42 to raise or lower (as the case may be) the slide 21 so as to compensate for the inclination of the contour 16.

I claim as my invention:

1. A work holder having, in combination, a base mounted for transverse and front to rear movement and having an upwardly inclined surface, a slide mounted for vertical movement on said surface, a work support carried by said slide, a cam slide mounted on said base for transverse movement relative thereto and under said first mentioned slide, a cam bar secured to said cam slide, said cam slide being adapted to be secured against movement with said base, an adjusting slide having a roller riding on said cam bar, said adjusting slide carrying an adjustable head adapted to support said first mentioned slide, and a spring disposed between said base and said adjusting slide and tending to hold said roller continually in contact with said cam bar.

2. A work holder having, in combination, a base movable transversely and in a front to rear direction, a cam having an inclined face slidably mounted on said base in a transverse direction but movable with said base in a front to rear direction, a work support adjustably mounted on said base and adapted to support a blank having an inclined cutting edge, said work support having means coacting with said cam so that upon lateral movement of said work blank in said transverse direction, vertical movement of said work blank in predetermined relation to the inclination of its contour will be effected.

3. A work holder having, in combination, a base movable transversely and in a front to rear direction, a slide mounted for vertical movement on said base, a cam bar mounted on said base for movement transversely thereof, said cam bar being adapted to be secured against movement with said base in a transverse direction but movable with said base in a front to rear direction, and an adjusting slide coacting with said cam bar, said adjusting slide having an adjustable connection with said first mentioned slide.

4. A work holder comprising, in combination with a support and an upstanding column on the support, a base mounted on said support for movement toward and from said column and also for movement in a perpendicular direction across said column, said base being formed with a surface inclined upwardly in the direction of said last mentioned movement, a slide mounted for generally vertical movement on said surface, a work support carried by said slide, a cam slide mounted for relative adjustment transversely on said base and under said first mentioned slide, said cam slide extending to said column, a retaining block secured transversely on said column and having a spline connection with said cam slide permitting lateral movement of the latter with said base, a cam bar secured to said cam slide, an adjusting slide having a roller riding on said bar, said adjusting slide carrying an adjusting head adapted to support said first mentioned slide, and a spring disposed between said base and said adjusting slide and tending to hold said roller continuously in contact with said bar.

5. A work holder comprising, in combination with a support and an upstanding column on the support, a base mounted on said support for movement toward and from said column and also for movement in a perpendicular direction across said column, a slide mounted for movement on said base, a work support carried by said slide, a cam bar mounted for relative adjustment transversely on said base and under said slide, means on said column and having a spline connection with said cam bar permitting lateral movement of the latter with said base, and an adjusting slide having follower means coacting with said bar, said adjusting slide being connected to said first mentioned slide.

6. A work holder comprising, in combination with a support and an upstanding column on the support, a base mounted on said support for movement toward and from said column and also for movement in a perpendicular direction across said column, said base being formed with a surface inclined upwardly in the direction of said last mentioned movement, a slide mounted for generally vertical movement on said surface, a work support carried by said slide, a cam bar mounted for relative adjustment transversely on said base, said cam bar extending toward said column, means on said column having a spline connection with said cam bar permitting lateral movement of the latter with said base in said perpendicular direction and follower means on said slide coacting with said cam bar, whereby said cam bar is operative to effect adjustment of said slide on said base upon movement of said base toward and from said column but is inoperative to effect adjustment of said slide through movement of said base in said perpendicular direction.

7. A work holder comprising, in combination with a support, a base slidable on said support in two mutually perpendicular directions, a cam member on said base, said member being relatively adjustable in one of said directions and being splined to said support for movement with said base in the other of said directions, a work slide mounted on said base for movement transversely of said cam member, and means on said slide coacting with said cam member to effect adjustment of said slide on said base upon relative movement of the latter along said cam member in said one direction.

8. A work holder comprising, in combination, a base, said base being formed with generally upwardly directed parallel ways, ball bearings in said ways, a slide mounted for reciprocation along said ways, said slide having ways engaging said ball bearings, a work support on said slide, the lower end of said slide projecting substantially beyond said first mentioned ways and being formed with a longitudinal slot, the sides of said slot being formed with parallel ways, an adjusting slide mounted in said last mentioned ways, an adjusting screw on said adjusting slide for engaging and supporting said first mentioned slide, a cam roller on the underside of said adjusting slide, and a cam engaging said roller to support said adjusting slide.

9. A work holder comprising, in combination, a base, said base being formed with parallel ways, a work slide mounted for reciprocation along said ways, one end of said slide projecting substantially beyond said first mentioned ways and being formed with spaced legs, the adjacent sides of said legs being formed with parallel ways, an adjusting slide mounted in said last mentioned ways, means for effecting a relative adjustment between said work slide and said adjusting slide, a cam follower on said adjusting slide, and a cam relatively adjustable on said base and coacting with said follower to adjust said work slide on said base.

10. A work holder comprising, in combination, a base reciprocable in a front to rear direction and constructed for periodic transverse movement at the completion of each front to rear stroke, a slide mounted for vertical movement on said base, an adjusting slide having a vertically adjustable connection with said first-mentioned slide, and means for moving said first-mentioned slide vertically in timed relation to the periodic transverse movement of the base comprising a cam follower on said adjusting slide and a cam bar slidably mounted on said base and fixed against movement with said base transversely thereof but movable with said base in the front to rear direction.

In testimony whereof I have hereunto affixed my signature.

JOHN EDGAR.